United States Patent
Kanda

(10) Patent No.: US 10,061,282 B2
(45) Date of Patent: Aug. 28, 2018

(54) FUNCTION CONTROL DEVICE, APPARATUS INCLUDING SAME, AND COMMUNICATION ESTABLISHING METHOD

(71) Applicant: Yoshimichi Kanda, Kanagawa (JP)

(72) Inventor: Yoshimichi Kanda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 345 days.

(21) Appl. No.: 14/948,493

(22) Filed: Nov. 23, 2015

(65) Prior Publication Data
US 2016/0161931 A1   Jun. 9, 2016

(30) Foreign Application Priority Data

Dec. 3, 2014  (JP) ................................ 2014-245289

(51) Int. Cl.
G05B 11/01    (2006.01)
G05B 19/042   (2006.01)
(Continued)

(52) U.S. Cl.
CPC ......... *G05B 19/042* (2013.01); *G06F 1/3209* (2013.01); *G06F 1/3287* (2013.01);
(Continued)

(58) Field of Classification Search
CPC .......... G05B 19/042; G05B 2219/2214; G06F 1/3293; G06F 1/3287; G06F 1/3209;
(Continued)

(56) References Cited

U.S. PATENT DOCUMENTS

| 8,161,300 B2 * | 4/2012 | Tani ........................ G06F 1/26 713/300 |
| 2007/0245164 A1 | 10/2007 | Mitarai |
| 2013/0212418 A1 | 8/2013 | Ueda |

FOREIGN PATENT DOCUMENTS

| JP | 2011-181006 | 9/2011 |
| JP | 2011-224792 | 11/2011 |
| JP | 2014-113731 | 6/2014 |

OTHER PUBLICATIONS

Apr. 12, 2016 European Search Report in corresponding European Patent Application No. EP 15197045.6.

* cited by examiner

*Primary Examiner* — Vu A Vu
(74) *Attorney, Agent, or Firm* — Cooper & Dunham LLP

(57) ABSTRACT

An apparatus includes a function control device to provide a specific function to the apparatus, a network control device to control communication between the apparatus and other apparatus via a network, and a main control device to control operation of the apparatus. The network control device operates while communication with the function control device is being cut off when the function control device is not supplied with power, The function control device includes a user circuit to detect restarting of a power supply to the function control device, and establish communication with the network control device in response to detection of restarting of the power supply to the function control device. The main control device controls communication between the apparatus and the other apparatus, through communication established between the main control device and the function control device and communication established between the function control device and the network control device.

9 Claims, 8 Drawing Sheets

(51) Int. Cl.
  *G06F 1/32*      (2006.01)
  *G06K 15/00*     (2006.01)
  *H04N 1/00*      (2006.01)

(52) U.S. Cl.
  CPC ....... *G06F 1/3293* (2013.01); *G06K 15/4055* (2013.01); *H04N 1/00896* (2013.01); *G05B 2219/2214* (2013.01); *H04N 2201/0094* (2013.01); *Y02D 10/122* (2018.01); *Y02D 10/171* (2018.01)

(58) Field of Classification Search
  CPC ........... G06K 15/4055; H04N 1/00896; H04N 2201/0094; Y02B 60/121; Y02B 60/1282
  USPC ........................................................ 700/20
  See application file for complete search history.

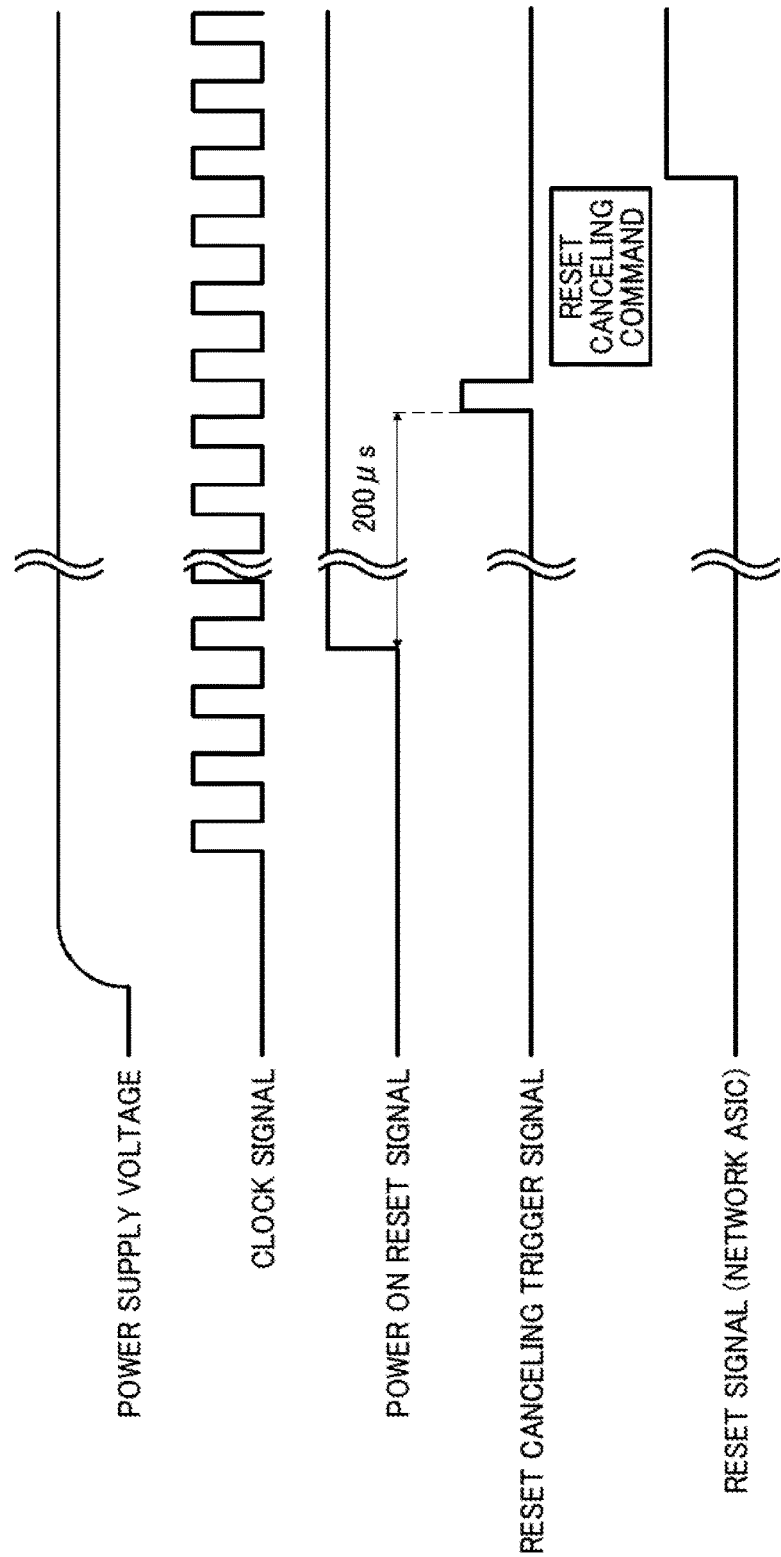

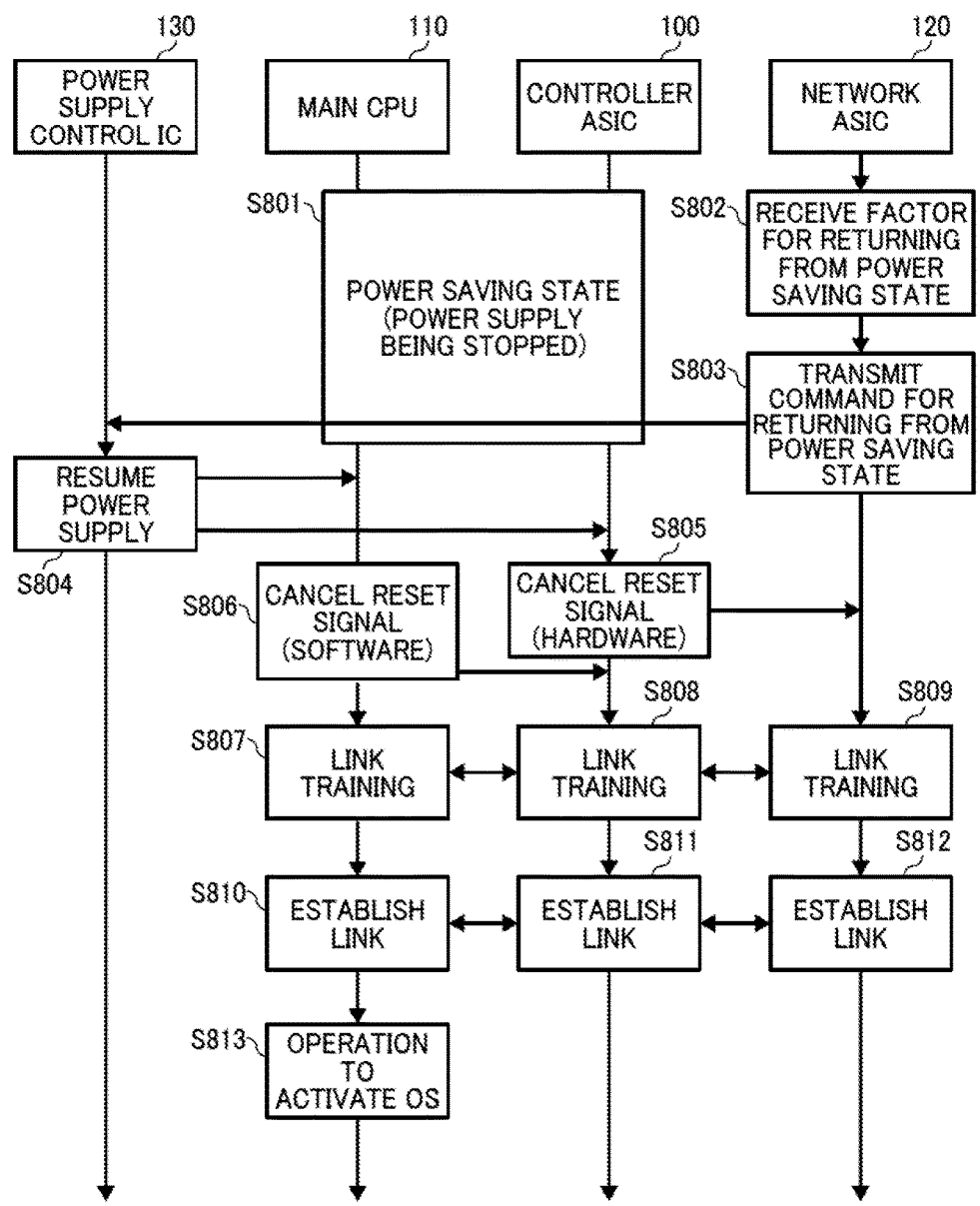

FUNCTION CONTROL DEVICE, APPARATUS INCLUDING SAME, AND COMMUNICATION ESTABLISHING METHOD

CROSS-REFERENCE TO RELATED APPLICATIONS

This patent application is based on and claims priority pursuant to 35 U.S.C. § 119(a) to Japanese Patent Application No. 2014-245289, filed on Dec. 3, 2014, in the Japan Patent Office, the entire disclosure of which is hereby incorporated by reference herein.

BACKGROUND

Technical Field

The present invention relates to a function control apparatus, an apparatus including the same, and a communication establishing method.

Description of the Related Art

In response to increasing demand for reducing power consumption in recent years, the recent information processing apparatuses are provided with arithmetic devices such as central processing units (CPUs) to control power consumption, thus stopping power supply to various units in the apparatus according to the operating state of the apparatus. For example, in response to receiving an operation request sent from another apparatus connected via a network, the information processing apparatus in a power saving state that is monitoring the network returns from the power saving state to a normal operating state.

Monitoring the network in the power saving state is performed by an application specific integrated circuit (ASIC) connected to a Peripheral Component Interconnect Express (PCIe) port of a main CPU, which controls entire information processing apparatus. This ASIC (hereinafter referred to as the "network ASIC") has mounted thereon a sub CPU that consumes less power than the main CPU, and the network ASIC functions as a power consumption control that operates under control of the sub CPU in the power saving state.

However, some main CPUs have only a few number of PCIe ports, and, in that case, there may be no PCIe port for connecting the network ASIC. In such a case, another configuration for monitoring the network in the power saving state is known. In this configuration, the network ASIC is connected to a PCIe port of a controller ASIC connected to a PCIe port of the main CPU. The controller ASIC is a main chip that provides a particular function implemented by the information processing apparatus.

In the information processing apparatus with the foregoing configurations, setting a link width, which is necessary for establishing a PCIe link when returning from the power saving state, and suppressing power consumption has been proposed.

In the case of the above-described configuration where the network ASIC is connected to a PCIe port of the controller ASIC, when returning from the power saving state, a PCIe link is first established between the main CPU and the controller ASIC, which enables the main CPU and the controller ASIC to communicate with each other. Thereafter, under control of the main CPU, a PCIe link is established between the controller ASIC and the network ASIC, which enables the controller ASIC and the network ASIC to communicate with each other.

Thus, it takes a longer time for the configurations to be able to communicate with each other when returning from the power saving state, compared with the case where the main CPU and the network ASIC are directly connected through PCIe.

SUMMARY

Example embodiments of the present invention include an apparatus including a function control device to provide a specific function to the apparatus, a network control device to control communication between the apparatus and other apparatus via a network, and a main control device to control operation of the apparatus. The network control device operates while communication with the function control device is being cut off when the function control device is not supplied with power. The function control device includes a user circuit to detect restarting of a power supply to the function control device, and establish communication with the network control device in response to detection of restarting of the power supply to the function control device. The main control device controls communication between the apparatus and the other apparatus, through communication established between the main control device and the function control device and communication established between the function control device and the network control device.

Example embodiments of the present invention include the above-described function control device.

Example embodiments of the present invention include a method of controlling establishment of communication with a network control device, performed by a function control device that provides a specific function to an apparatus that operates under control of a main control device. The method includes: controlling communication with a network control device so as to cut off communication with the network control device when the function control device is not supplied with electric power; detecting restarting of the power supply to the function control device; and establishing communication with the network control device, in response to detection of restarting of the power supply to the function control device, so as to enable the main control device to control communication between the apparatus and other apparatus, through communication established between the main control device and the function control device and communication established between the function control device and the network control device.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is a diagram illustrating the state of various signals when power supply to a controller ASIC according to the embodiment of the present invention is started;

FIG. 8 is a sequence diagram illustrating an operation when the information processing apparatus according to the embodiment of the present invention returns from a power saving state.

Figure 1:
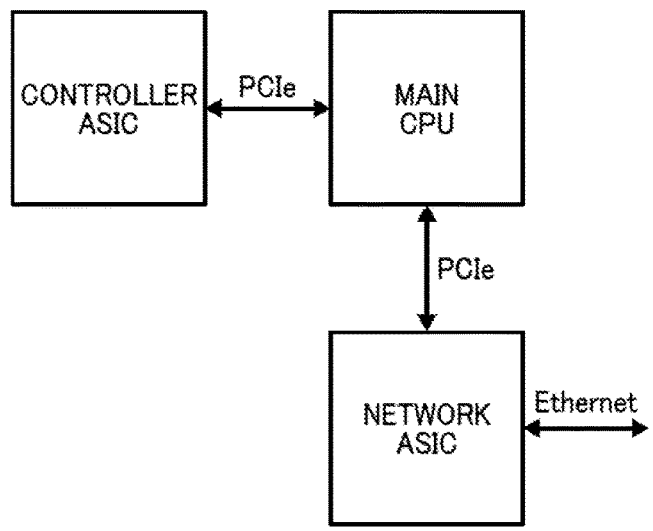
FIG. 1 is a diagram illustrating a hardware connection configuration of a conventional information processing apparatus for comparison with an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, an embodiment of the present invention will be described in detail with reference to the drawings. In the embodiment, an information processing apparatus in which a main CPU and a network control chip that processes data from another apparatus connected via a network are connected via a main chip will be described by way of example. The network control chip has mounted thereon a sub CPU that consumes less power than the main CPU, and operates under control of the sub CPU in the power saving state.

Figure 2:
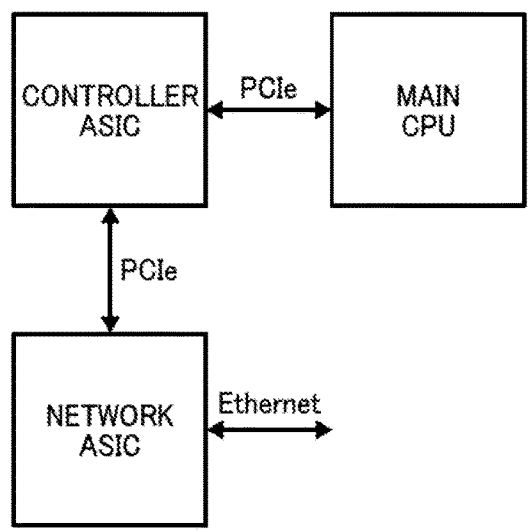
FIG. 2 is a diagram illustrating a hardware connection configuration of a conventional information processing apparatus for comparison with the embodiment of the present invention.

At first, conventional configurations will be described, prior to the description of the embodiment. FIGS. 1 and 2 are diagrams each illustrating a hardware connection configuration of a conventional information processing apparatus for comparison with the embodiment of the present invention. An information processing apparatus illustrated in FIG. 1 includes a main CPU, a controller ASIC, and a network ASIC. The controller ASIC and the network ASIC are connected to the main CPU through PCIe.

The main CPU is a main control unit that controls the entire information processing apparatus. The controller ASIC is a main chip that is mounted on the motherboard of the information processing apparatus, and that provides a particular function of the information processing apparatus under control of the main CPU. For example, in the case where the information processing apparatus is an image processing apparatus, the controller ASIC provides particular functions such as control of image rotating processing and image processing engine (for example, a print engine, a scanner, etc.).

The network ASIC is a network control chip that controls communication with another apparatus connected via a network such as Ethernet (registered trademark) or a local area network (LAN). For example, the network ASIC receives a certain operation request from another apparatus. In the case where the information processing apparatus is an image processing apparatus, for example, the certain operation request is a print request from another apparatus connected via a network.

The network ASIC operates in a state where power supply to the main CPU and the controller ASIC is stopped (hereinafter will be referred to as a "power saving state). In the power saving state, upon receipt of, for example, a print instruction from another apparatus connected via a network, the network ASIC performs a return operation from the power saving state. The operation of each configuration in the case of returning from the power saving state will be described in detail later.

In the configuration illustrated in FIG. 1, the controller ASIC and the network ASIC are connected via PCIe to the main CPU. If the main CPU only has a few PCIe ports, it is difficult to assign a PCIe port for the network ASIC. In view of this, as illustrated in FIG. 2, the conventional information processing apparatus may have another configuration in which the main CPU and the network ASIC are connected via the controller ASIC through PCIe.

Figure 3:
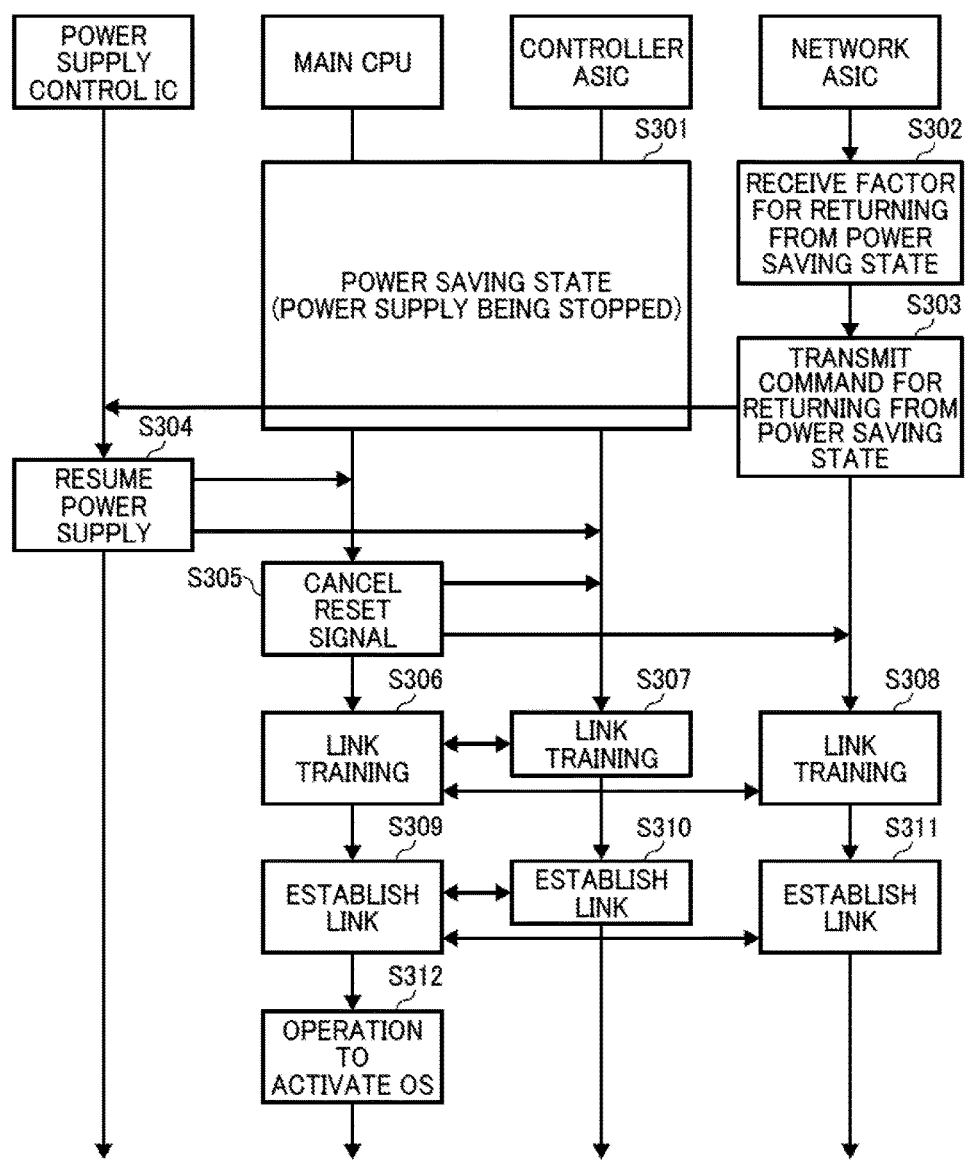
FIG. 3 is a sequence diagram illustrating an operation when the conventional information processing apparatus for comparison with the embodiment of the present invention, which is illustrated in FIG. 1, returns from a power saving state.
Figure 4:
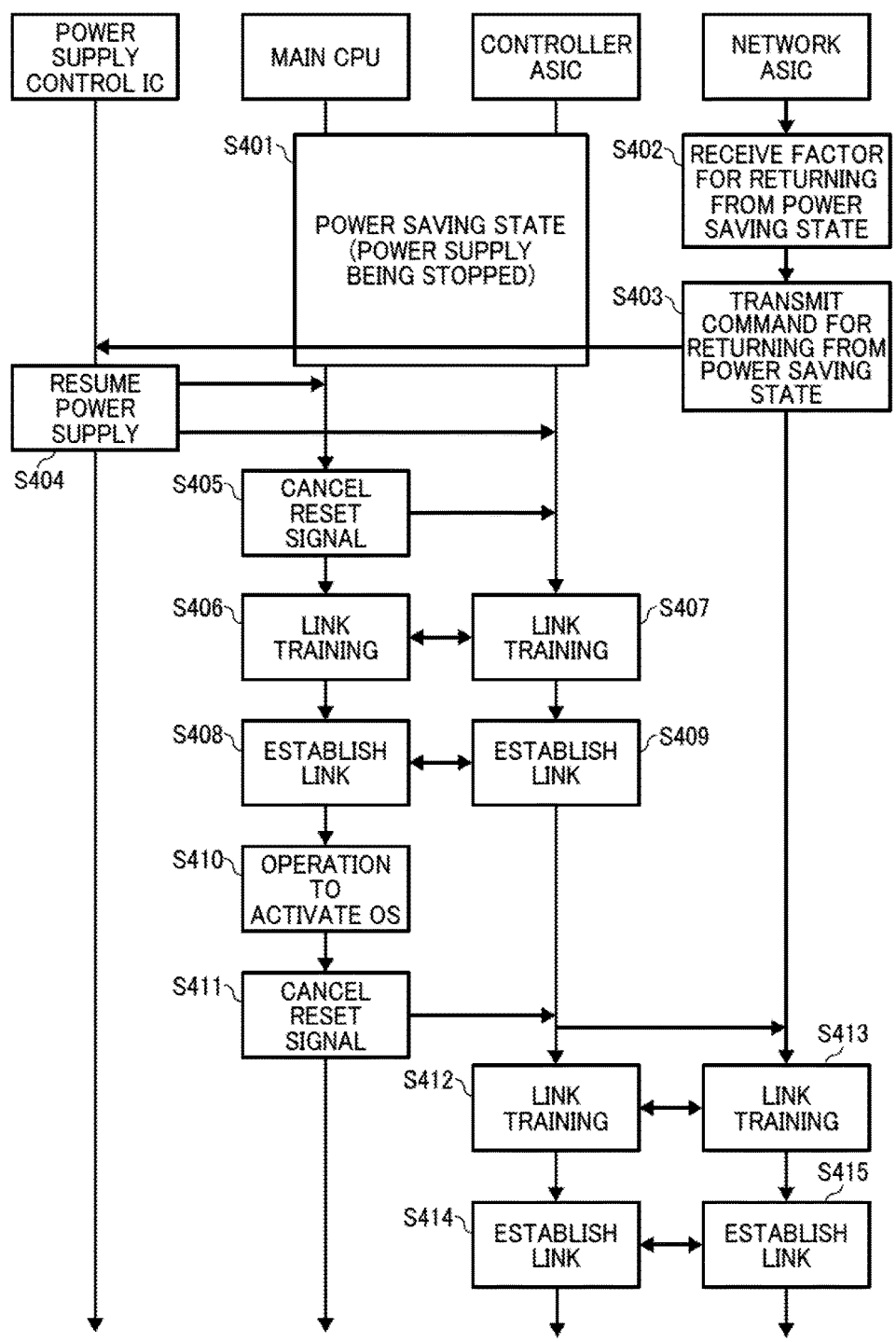
FIG. 4 is a sequence diagram illustrating an operation when the conventional information processing apparatus for comparison with the embodiment of the present invention, which is illustrated in FIG. 2, returns from a power saving state.

Next, an operation in the case of returning from the power saving state, executed by the conventional information processing apparatuses illustrated in FIGS. 1 and 2, will be sequentially described. FIG. 3 is a sequence diagram illustrating an operation in the case of returning from the power saving state, executed by the information processing apparatus illustrated in FIG. 1. FIG. 4 is a sequence diagram illustrating an operation in the case of returning from the power saving state, executed by the information processing apparatus illustrated in FIG. 2.

As illustrated in FIG. 3, it is assumed that the main CPU and the controller ASIC are in the power saving state (S301). The power saving state indicates that, in response to the absence of an operation request for the information processing apparatus for a certain period, power supply to the main CPU and the controller ASIC is stopped. In the power saving state, communication between the main CPU and the controller ASIC and communication between the main CPU and the network ASIC are cut off by a reset signal.

In the case where the main CPU and the controller ASIC are in the power saving state, the network ASIC receives a factor for returning from the power saving state (S302). An exemplary factor for returning from the power saving state is a print request sent from another apparatus connected via a network. Upon receipt of the factor for returning from the power saving state, the network ASIC transmits a command for returning from the power saving state to a power supply control integrated circuit (IC) that controls power supply to the information processing apparatus (S303).

Upon receipt of the command sent from the network ASIC for returning from the power saving state, the power supply control IC resumes power supply to the main CPU and the controller ASIC (S304). The main CPU, to which power supply is resumed, performs operation to cancel the reset signal for the controller ASIC and the network ASIC, in accordance with a control program stored in a storage medium such as a hard disk drive (HDD) (S305).

When the reset signal is canceled by the main CPU, link training is performed between the main CPU and the controller ASIC and between the main CPU and the network ASIC (S306, S307, and S308). Link training is exchange of data performed on a PCIe interface in order to establish a link (connection) between configurations through PCIe.

When link training is performed between configurations, a link is established between the main CPU and the controller ASIC, and between the main CPU and the network ASIC (S309, S310, and S311). The main CPU performs operation to activate an operating system (OS) (S312). In this manner, in the configuration illustrated in FIG. 1, when power supply to the main CPU and so forth is resumed, a link is established substantially at the same time between the main CPU and the controller ASIC, and between the main CPU and the network ASIC.

Next, the operation of the configuration illustrated in FIG. 2 will be described. As illustrated in FIG. 4, it is assumed that the main CPU and the controller ASIC are in the power saving state (S401). In the power saving state, communication between the main CPU and the controller ASIC and communication between the controller ASIC and the network ASIC are cut off by a reset signal.

The operation in S402 to S404 is performed in a substantially similar manner as described above referring to the operation in S302 to S304 illustrated in FIG. 3. At first, the main CPU, to which power supply is resumed, performs operation to cancel the reset signal for the controller ASIC, in accordance with a control program stored in a storage medium such as an HDD (S405).

When the reset signal for the controller ASIC is canceled by the main CPU, link training is performed between the main CPU and the controller ASIC (S406 and S407). When link training is performed, a link is established between the main CPU and the controller ASIC (S408 and S409). Thereafter, the main CPU performs operation to activate the OS (S410).

In accordance with the control program, the main CPU performs operation to cancel the reset signal for the network ASIC via the controller ASIC with which a link has already been established (S411). When the reset signal for the network ASIC is canceled, link training is performed between the controller ASIC and the network ASIC (S412 and S413). When link training is performed, a link is established between the controller ASIC and the network ASIC (S414 and S415).

In this manner, in the configuration illustrated in FIG. 2, when power supply to the main CPU and so forth is resumed, a link is established between the main CPU and the controller ASIC, and then a link is established between the controller ASIC and the network ASIC. Therefore, it takes a longer time to establish a link between the configurations than the configuration illustrated in FIG. 1 since it is necessary to first establish a link between the main CPU and the controller ASIC.

Figure 5:
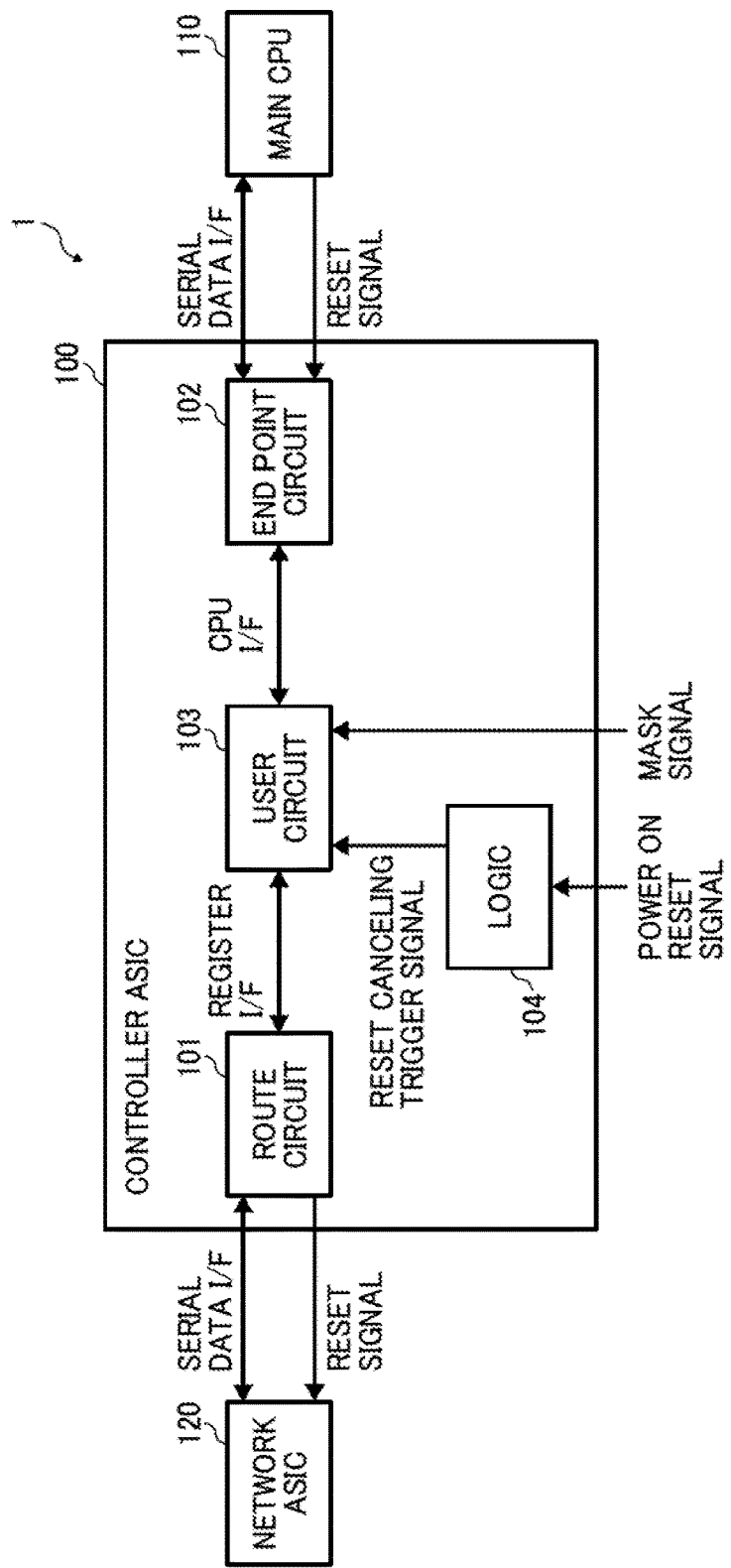
FIG. 5 is a block diagram illustrating a hardware configuration of an information processing apparatus according to the embodiment of the present invention.

Accordingly, in order to solve the foregoing problem, the information processing apparatus according to the embodiment operates so as to reduce the time until communication between the configurations becomes possible when returning from the power saving state, even in the case of the hardware connection relationship illustrated in FIG. 2. Hereinafter, the configuration of the information processing apparatus according to the embodiment will be described. FIG. 5 is a block diagram illustrating a configuration regarding communication control of each configuration, in the hardware configuration of an information processing apparatus 1 according to the embodiment.

As illustrated in FIG. 5, the information processing apparatus 1 according to the embodiment has a configuration in which a main CPU 110 and a network ASIC 120 are connected via a controller ASIC 100 through PCIe (serial data I/F), like the configuration illustrated in FIG. 2. The main CPU 110 and the network ASIC 120 operate in a similar manner as the main CPU and the network ASIC described above and illustrated in FIGS. 1 and 2.

That is, the main CPU 110 functions as a main control unit that controls the entire information processing apparatus 1. In addition, the network ASIC 120 functions as a network control device that controls communication with another apparatus connected via a network.

The controller ASIC 100 provides a particular function implemented by the information processing apparatus 1, such that it functions as a function control device connected to the network ASIC 120. Hereinafter, the controller ASIC 100 according to the embodiment will be described in detail. As illustrated in FIG. 5, the controller ASIC 100 includes a route circuit 101, an end point circuit 102, a user circuit 103, and a logic 104. The route circuit 101 is an intellectual property (IP) core that controls the PCIe interface. Specifically, the route circuit 101 performs data communication control with a device on the other side (the network ASIC 120 in the case illustrated in FIG. 5), sets, as a master, parameters for the device on the other side, and performs communication control through a reset signal. For example, the route circuit 101 performs control to cut off the communication with the network ASIC 120 through a low level (L level) reset signal.

The end point circuit 102 is an IP core that controls the PCIe interface. Specifically, the end point circuit 102 performs data communication control with a device on the other side (the main CPU 110 in the case illustrated in FIG. 5), receives, as a slave, parameter settings, and receives a reset signal for performing communication control.

For example, the end point circuit 102 performs control to cut off the communication with the main CPU 110 through an L level reset signal from the main CPU 110. In contrast, when the main CPU 110 performs operation to cancel the reset signal, that is, switches the reset signal to high level (H level), the end point circuit 102 performs control to establish communication with the main CPU 110.

In response to detection of a reset canceling trigger signal output from the later-described logic 104, the user circuit 103 performs a reset signal canceling operation on the route circuit 101 via a register interface (I/F). Specifically, the user circuit 103 performs control to cancel a PCIe resetting register bit of the route circuit 101. In doing so, the route circuit 101 performs control to switch the reset signal to H level and to establish communication with the network ASIC 120.

The logic 104, which may be referred to as a logic circuit 104, detects a reset signal for controlling the controller ASIC 100 to enter a reset state (initial state) in response to the fact that the power supply to the controller ASIC 100 is resumed. The reset signal is a signal for maintaining the controller ASIC 100 to be in the initial state until voltage becomes stable after the power supply to the controller ASIC 100 is resumed, and will be referred to as a "power on reset signal" hereinafter. For example, when the power on reset signal is at L level, the controller ASIC 100 is controlled to be in the initial state. When the power on reset signal is switched to H level, the operation of the controller ASIC 100 starts.

The logic 104 outputs to the user circuit 103 a reset canceling trigger signal in response to the fact that the detected power on reset signal has been switched to H level. That is, in response to detection of a reset canceling trigger signal output from the logic 104, the user circuit 103 functions as a power supply start detector that detects that the power supply to the controller ASIC 100 has been started. In addition, in accordance with the detection result that the power supply to the controller ASIC 100 has been started, the user circuit 103 functions as a communication establishing processor that establishes communication with the network ASIC 120 with which communication has been cut off.

In this manner, cancellation of a reset signal through a reset canceling trigger signal is done by hardware. In contrast, cancellation of a reset signal in accordance with a control program, as in S305 and so forth illustrated in FIG. 3, is done by software.

FIG. 6 is a diagram illustrating the state of various signals when power supply to the controller ASIC 100 is started. As illustrated in FIG. 6, from the top, a power supply voltage supplied to the controller ASIC 100, a clock signal, a power on reset signal, a reset canceling trigger signal, and a reset signal for the network ASIC are illustrated.

As illustrated in FIG. 6, when power supply to the controller ASIC 100 is started, the power supply voltage increases to a predetermined voltage, and counting based on the clock signal starts. The power on reset signal is output at L level in order to maintain the initial state of the controller ASIC 100 until the power supply voltage becomes stable, and, when the power supply voltage becomes stable, the power on reset signal is switched to H level.

When the power on reset signal is switched to H level, the reset canceling trigger signal is input. In the case illustrate in FIG. 6, after, for example, 200 μs since the power on reset signal is switched to H level, the reset canceling trigger signal is input. This is for performing cancellation of the reset signal after the PCIe circuit of the network ASIC 120 becomes stable.

In response to an input of the reset canceling trigger signal, the user circuit 103 outputs a command for canceling the reset signal to the route circuit 101 via the register I/F. In doing so, the reset signal for the network ASIC 120 is switched from L level to H level, and a link is established between the controller ASIC 100 and the network ASIC 120.

In addition, as illustrated in FIG. 5, the user circuit 103 detects a mask signal that invalidates the reset canceling trigger signal. The mask signal is generated in accordance with, for example, the settings of an input pin (configuration pin) provided outside the controller ASIC 100. For example, in the case where the mask signal is at L level, the user circuit 103 detects the reset canceling trigger signal, and performs a reset signal canceling operation on the route circuit 101.

In contrast, in the case where the mask signal is at H level, the user circuit 103 does not perform operation to cancel the reset signal in response to the reset canceling trigger signal, and performs operation to cancel the reset signal under control of the main CPU 110. Specifically, the main CPU 110 performs operation to cancel the reset signal for the controller ASIC 100 in accordance with a control program stored in a storage medium such as an HDD.

In doing so, the user circuit 103 receives a command sent from the end point circuit 102 via the CPU I/F for canceling the reset signal, and performs a reset signal canceling operation on the route circuit 101 via the register I/F. That is, the H level mask signal is a signal for preventing communication establishment in accordance with the detection result indicating starting of the power supply to the controller ASIC 100.

Figure 7A:
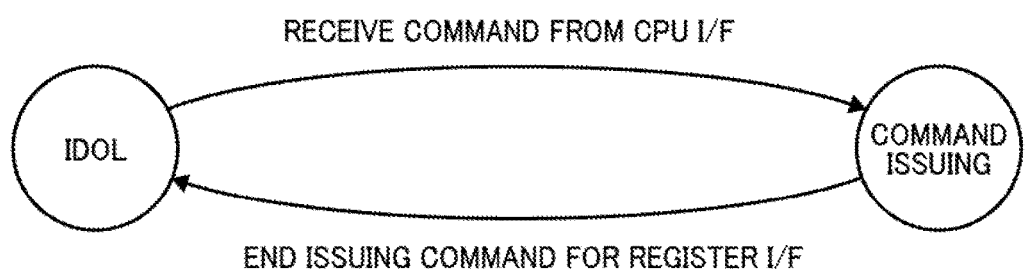
FIGS. 7A and 7B are diagrams illustrating a state machine of a user circuit according to the embodiment of the present invention.
Figure 7B:
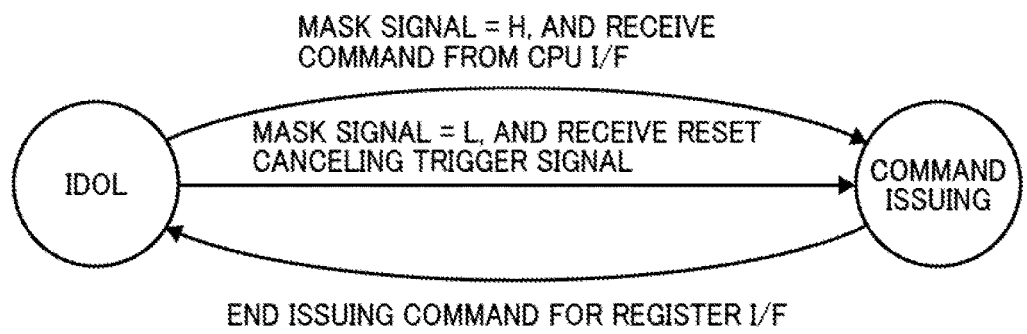

FIGS. 7A and 7B are diagrams illustrating a state machine of the user circuit 103. FIG. 7A is a diagram illustrating a state machine of the user circuit 103 in the case of applying the conventional configuration that only implements control performed by the main CPU 110. FIG. 7B is a diagram illustrating a state machine of the user circuit 103 in the case of applying the configuration according to the embodiment illustrated in FIG. 5.

As illustrated in FIG. 7A, in the case of control only performed by the main CPU 110, upon receipt of a command for canceling the reset signal via the CPU I/F, the user circuit 103 changes from an idle state to a command issuing state. The user circuit 103, which has changed to the command issuing state, issues a command for canceling the reset signal to the route circuit 101 via the register FF. When the user circuit 103 ends issuing the command, the user circuit 103 changes from the command issuing state to the idle state.

In contrast, as illustrated in FIG. 7B, in the case of the configuration according to the embodiment, when the mask signal is at H level and when the user circuit 103 receives a command for canceling the reset signal via the CPU I/F, the user circuit 103 changes from the idle state to the command issuing state. Furthermore, in the case of the configuration according to the embodiment, when the mask signal is at L level and when the user circuit 103 receives a reset canceling trigger signal from the logic 104, the user circuit 103 changes from the idle state to the command issuing state.

The user circuit 103, which has changed to the command issuing state, issues a command for canceling the reset signal to the route circuit 101 via the register I/F, like the case illustrated in FIG. 7A. When the user circuit 103 ends issuing the command, the user circuit 103 changes from the command issuing state to the idle state.

Next, an operation when the information processing apparatus 1 according to the embodiment returns from the power saving state will be described. FIG. 8 is a sequence diagram illustrating the operation when the information processing apparatus 1 according to the embodiment returns from the power saving state. Note that it is assumed that the mask signal is set to L level.

As illustrated in FIG. 8, it is assumed that the main CPU 110 and the controller ASIC 100 are in the power saving state (S801). That is, the state is such that communication between the main CPU 110 and the controller ASIC 100 and communication between the controller ASIC 100 and the network ASIC 120 are cut off by a reset signal.

The operation in S802 to S804 is the same as the operation in S402 to S404. The controller ASIC 100, to which power supply is resumed, detects a reset canceling trigger signal from the logic 104, and performs operation to cancel a reset signal for the network ASIC 120 (S805). Note that the operation in S805 is performed by hardware, as described above.

In addition, the main CPU, to which power supply is resumed, performs operation to cancel a reset signal for the controller ASIC 100, in accordance with a control program stored in a storage medium such as an HDD (S806). Note that the operation in S806 is performed by software, as described above. In addition, the operation in S805 and the operation in S806 are performed at substantially at the same time when power supply to the controller ASIC 100 and the main CPU 110 is resumed.

When the reset signal is canceled, link training is performed between the main CPU 110 and the controller ASIC 100 and between the controller ASIC 100 and the network ASIC 120 (S807, S808, and S809). When link training is performed between the configurations, a link is established between the main CPU 110 and the controller ASIC 100, and between the controller ASIC 100 and the network ASIC 120 (S810, S811, and S812). The main CPU 110 performs operation to activate the OS (S813).

Accordingly, the main CPU 110 communicates with another apparatus connected via a network, via communication established between the main CPU 110 and the controller ASIC 100 and communication established between the controller ASIC 100 and the network ASIC 120. Specifically, at first, the network ASIC 120 receives data (such as a print request) from another apparatus, and outputs the data to the controller ASIC 100. The controller ASIC 100 analyzes the data output from the network ASIC 120, and outputs the data to the main CPU 110. Accordingly, the main CPU 110 controls each configuration unit of the information processing apparatus 1 to execute the requested operation. In addition, in the case where the requested operation is completed, the main CPU 110 outputs certain data (such as an operation completion notification) to the controller ASIC 100. The controller ASIC 100 analyzes the data output from the main CPU 110, and controls the network ASIC 120. Accordingly, the network ASIC 120 executes operation necessary for another apparatus connected via a network.

As has been described above, the controller ASIC 100 according to the embodiment detects the fact that power supply is started in the power saving state, and establishes communication with the network ASIC 120 in accordance with the detection result. Accordingly, when the controller ASIC 100 according to the embodiment returns from the power saving state, the controller ASIC 100 can establish communication with the network ASIC 120, without being under control of the main CPU 110. That is, a link is established between the controller ASIC 100 and the network ASIC 120, without waiting for a link between the main CPU 110 and the controller ASIC 100 to be established.

Therefore, according to the embodiment, in a configuration where a power saving control (the network ASIC 120) that operates in the power saving state is connected to a main control (the main CPU 110) that controls the entire apparatus via another configuration (controller ASIC 100), it becomes possible to reduce the time until communication between the main control and the power saving control becomes possible, when returning from the power saving state.

According to the embodiment, when returning from the power saving state, the main CPU 110 need not perform operation to cancel the reset signal for the network ASIC 120, and accordingly, the processing load on the main CPU 110 is alleviated. Therefore, the operation of the information processing apparatus 1 for returning from the power saving state can be more promptly performed.

In the embodiment, the mask signal is set, and, in the case where the mask signal is at L level, the controller ASIC 100 performs operation to cancel the reset signal for the network ASIC 120, on the basis of the reset canceling trigger signal. According to the above-described configuration, whether to validate the operation based on the reset canceling trigger signal can be controlled. Therefore, it becomes possible to prevent a failure from occurring in a series of operations due to a cause such as the cause that a control program executed by the main CPU 110 is incapable of coping with the case where an operation based on the reset canceling trigger signal is performed. A failure in an operation may occur in the case where, for example, a reset signal canceling operation based on the reset canceling trigger signal has already been performed, despite the fact that the main CPU 110 is operating on the assumption that the reset signal for the network ASIC 120 has not been canceled.

However, such a configuration is not essential, and, on the assumption that a control program executed by the main CPU 110 can cope with an operation based on the reset canceling trigger signal, a configuration regarding an operation based on the mask signal may be omitted.

In the above-described embodiment, the case of establishing communication between the configurations in returning from the power saving state has been described by way of example. Alternatively, the embodiment is similarly applicable to the case of establishing communication between the configurations when the information processing apparatus 1 changes from a power off state to a power on state.

Figure 9:
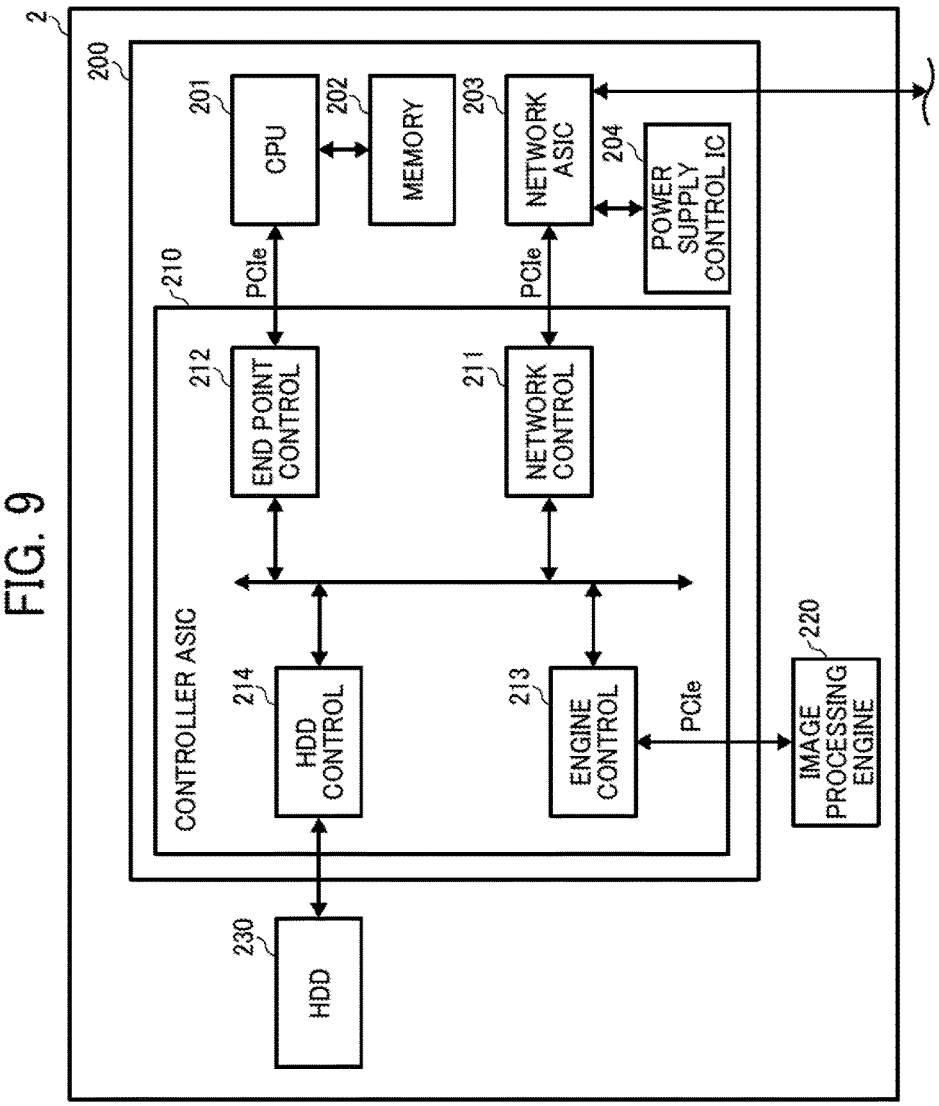
FIG. 9 is a block diagram illustrating a hardware configuration of an image processing apparatus according to the embodiment of the present invention.

An example of the information processing apparatus 1 according to the embodiment includes an image processing apparatus serving as a multifunction peripheral (MFP) having a printer function, a scanner function, a copy function, and so forth. FIG. 9 is a block diagram illustrating a configuration regarding operation of establishing communication between the configurations according to the embodiment, in the hardware configuration of an image processing apparatus 2 according to the embodiment.

As illustrated in FIG. 9, the image processing apparatus 2 includes a controller unit 200, an image processing engine 220, and an HDD 230. The controller unit 200 includes a CPU 201, a memory 202, a network ASIC 203, a power supply control IC 204, and a controller ASIC 210. The controller ASIC 210 includes a network control 211, an end point control 212, an engine control 213, and an HDD control 214.

The network control 211 has a function corresponding to the route circuit 101, the user circuit 103, and the logic 104 illustrated in FIG. 5. The end point control 212 has a function corresponding to the end point circuit 102. The engine control 213 controls the image processing engine 220. The HDD control 214 controls the HDD 230, and stores a temporary image and an image to be repeatedly used.

The power supply control IC 204 controls stopping and resuming of power supply to each unit included in the image processing apparatus 2. The image processing engine 220 is a mechanism that actually implements image operation, and is a print engine, a scanner, or the like.

The CPU 201 performs control regarding image operation, besides performing operation like the main CPU 110 illustrated in FIG. 5. Specifically, for example, in the case of the operation of copying, scanning, or the like, the CPU 201 controls the engine control 213 and the end point control 212, and writes an image obtained by reading a document with a scanner, which is one type of the image processing engine 220, to the memory 202.

In the case of the operation of copying, printing, or the like, the CPU 201 reads out image data (a read image) written in the memory 202. The CPU 201 controls the engine control 213 and the end point control 212, and outputs the read-out image data to a printer engine, which is one type of the image processing engine 220. Accordingly, the image data is output and an image is formed on a sheet.

In the case of generating image data to be used in a print operation, the CPU 201 controls the network control 211 and the end point control 212, and writes rendering data, transmitted from another apparatus via the network ASIC 203, to the memory 202. The CPU 201 activates a rendering accelerator, decodes the rendering data written in the memory 202, renders an image in the memory 202, and generates image data.

When the image data is generated, the CPU 201 controls the engine control 213 and the end point control 212, and outputs the generated image data to a printer engine, which is one type of the image processing engine 220. Accordingly, the image data is output and an image is formed on a sheet.

The network ASIC 203 has a function corresponding to the network ASIC 120 illustrated in FIG. 5. In the power saving state, upon receipt of rendering data or the like from another apparatus connected via a network, the network ASIC 203 controls the power supply control IC 204, and resumes power supply to the CPU 201 and the controller ASIC 210. When the power supply to the controller ASIC 210 is resumed, the network control 211 detects a reset canceling trigger signal, and resumes communication with the network ASIC 203.

According to some embodiments of the present invention, when an apparatus returns from the power saving state, the time required for enabling a main control that controls the entire apparatus and a power saving control that operates in the power saving state to communicate with each other can be reduced.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An apparatus, comprising:
   a function control device configured to provide a specific function to the apparatus;
   a network control device configured to control communication between the apparatus and other apparatus via a network, wherein the network control device operates while communication with the function control device is being cut off when the function control device is not supplied with power; and
   a main control device configured to control operation of the apparatus,
   wherein the function control device includes:
      a user circuit configured to detect restarting of a power supply to the function control device, and establish communication with the network control device in response to detection of restarting of the power supply to the function control device, and
   wherein the main control device controls communication between the apparatus and the other apparatus, through communication established between the main control device and the function control device and communication established between the function control device and the network control device, and
   wherein the function control device further includes:
      a logic circuit configured to detect a trigger signal for controlling the function control device to be in an initial state that is output when restarting the power supply to the function control device, and to output a canceling signal for cancelling the trigger signal when a predetermined time elapses after detection of the trigger signal, wherein the user circuit detects restarting of a power supply to the function control device based on the canceling signal output by the logic circuit.

2. The apparatus of claim 1, wherein the user circuit is further configured to detect an invalidating signal for invalidating the canceling signal output by the logic circuit, and establish the communication with the network control device according to an instruction from the main control device in place of the canceling signal output by the logic circuit, in response to the detection of the signal for invalidating the canceling signal.

3. The apparatus of claim 2, wherein the signal for invalidating the canceling signal is generated based on settings of an input pin disposed externally of the function control device.

4. The apparatus of claim 1, wherein the apparatus is an information processing apparatus or an image processing apparatus.

5. A function control device for providing a specific function to an apparatus that operates under control of a main control device, the function control device comprising:
   a route circuit configured to control communication with a network control device so as to cut off communication with the network control device when the function control device is not supplied with electric power,
   a user circuit configured to detect restarting of the power supply to the function control device, and establish communication with the network control device, in response to detection of restarting of the power supply to the function control device, so as to enable the main control device to control communication between the apparatus and other apparatus, through communication established between the main control device and the function control device and communication established between the function control device and the network control device; and
   a logic circuit configured to detect a trigger signal for controlling the function control device to be in an initial state that is output when restarting the power supply to the function control device, and to output a canceling signal for cancelling the trigger signal when a predetermined time elapses after detection of the trigger signal,
   wherein the user circuit detects restarting of a power supply to the function control device based on the canceling signal output by the logic circuit.

6. The function control device of claim 5, wherein the user circuit is further configured to detect an invalidating signal for invalidating the canceling signal output by the logic circuit, and establish the communication with the network control device according to an instruction from the main control device in place of the canceling signal output by the logic circuit, in response to the detection of the signal for invalidating the canceling signal.

7. The function control device of claim 6, wherein the signal for invalidating the canceling signal is generated based on settings of an input pin disposed externally of the function control device.

8. A method of controlling establishment of communication with a network control device, performed by a function control device that provides a specific function to an apparatus that operates under control of a main control device, the method comprising:
   controlling communication with a network control device so as to cut off the communication with the network control device when the function control device is not supplied with electric power;
   detecting restarting of the power supply to the function control device; and
   establishing communication with the network control device, in response to detection of restarting of the power supply to the function control device, so as to enable the main control device to control communication between the apparatus and other apparatus, through communication established between the main control device and the function control device and communication established between the function control device and the network control device,
   detecting a trigger signal for controlling the function control device to be in an initial state that is output when restarting the power supply to the function control device;
   outputting a canceling signal for cancelling the trigger signal when a predetermined time elapses after detection of the trigger signal,
   wherein detecting includes detecting restarting of a power supply to the function control device based on the canceling signal output by the outputting.

9. The method of claim 8, further comprising:
   detecting an invalidating signal for invalidating the canceling signal output by the outputting; and
   establishing the communication with the network control device according to an instruction from the main control device in place of the canceling signal output by the outputting, in response to the detection of the signal for invalidating the canceling signal.

* * * * *